United States Patent
Ogihara et al.

(10) Patent No.: US 12,076,905 B2
(45) Date of Patent: *Sep. 3, 2024

(54) METHOD FOR PRODUCING RESIN CONTAINER AND APPARATUS FOR PRODUCING RESIN CONTAINER

(71) Applicant: NISSEI ASB MACHINE CO., LTD., Nagano (JP)

(72) Inventors: Shuichi Ogihara, Nagano (JP); Masatoshi Ando, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 236 days.

This patent is subject to a terminal disclaimer.

(21) Appl. No.: 17/641,914

(22) PCT Filed: Sep. 11, 2020

(86) PCT No.: PCT/JP2020/034562
§ 371 (c)(1),
(2) Date: Mar. 10, 2022

(87) PCT Pub. No.: WO2021/049638
PCT Pub. Date: Mar. 18, 2021

(65) Prior Publication Data
US 2022/0332033 A1 Oct. 20, 2022

(30) Foreign Application Priority Data
Sep. 12, 2019 (JP) .................. 2019-166591
Sep. 12, 2019 (JP) .................. 2019-166592

(51) Int. Cl.
*B29C 49/06* (2006.01)
*B29C 49/36* (2006.01)
(Continued)

(52) U.S. Cl.
CPC ............ *B29C 49/062* (2013.01); *B29C 49/36* (2013.01); *B29C 49/42113* (2022.05);
(Continued)

(58) Field of Classification Search
CPC ... B29C 49/36; B29C 49/064; B29C 45/0053; B29C 49/6427; B29C 49/42113;
(Continued)

(56) References Cited

U.S. PATENT DOCUMENTS

| 4,151,249 A | 4/1979 | Lee |
| 5,744,176 A | 4/1998 | Takada et al. |

(Continued)

FOREIGN PATENT DOCUMENTS

| CN | 1304348 A | 7/2001 |
| CN | 1867443 A | 11/2006 |

(Continued)

OTHER PUBLICATIONS

International Search Report and Written Opinion of the International Searching Authority issued in International Patent Application No. PCT/JP2020/034562, dated Nov. 10, 2020, along with an English translation thereof.

(Continued)

*Primary Examiner* — Monica A Huson
(74) *Attorney, Agent, or Firm* — Greenblum & Bernstein, P.L.C.

(57) ABSTRACT

Provided is a resin container manufacturing method including: an injection molding process of injection molding a plurality of preforms along a predetermined arrangement direction; a temperature adjustment process of adjusting a temperature of the preform; and a blow molding process of molding a resin container from the preform. After the injection molding process, the preform and the container are conveyed along a conveying direction intersecting the (Continued)

arrangement direction over the temperature adjustment process and the blow molding process. The temperature adjustment process includes a first temperature adjustment process of adjusting the temperature of the preform, a second temperature adjustment process of adjusting the temperature of the preform under a condition different from that of the first temperature adjustment process, and a fine adjustment process of finely adjusting the temperature of the preform.

14 Claims, 7 Drawing Sheets

(51) Int. Cl.
  *B29C 49/42* (2006.01)
  *B29C 49/64* (2006.01)
  *B29K 67/00* (2006.01)
  *B29L 31/00* (2006.01)

(52) U.S. Cl.
  CPC ...... *B29C 49/6418* (2013.01); *B29C 49/6427* (2013.01); *B29C 49/648* (2022.05); *B29K 2067/003* (2013.01); *B29L 2031/7158* (2013.01)

(58) Field of Classification Search
  CPC . B29C 49/062; B29C 49/6418; B29C 49/648; B29C 49/42122; B29C 2049/023; B29C 2949/0715; B29C 49/0064; B29C 49/6845; B29C 2045/725; B29B 11/08; B29L 2031/7158; B29L 2031/712; B29K 2067/003
  See application file for complete search history.

(56) References Cited

U.S. PATENT DOCUMENTS

| | | | |
|---|---|---|---|
| 5,753,279 A | 5/1998 | Takada et al. | |
| 5,869,110 A | 2/1999 | Ogihara | |
| 5,972,255 A | 10/1999 | Takada et al. | |
| 6,019,933 A | 2/2000 | Takada et al. | |
| 6,109,907 A | 8/2000 | Takada et al. | |
| 6,139,789 A | 10/2000 | Neter et al. | |
| 6,247,916 B1 | 6/2001 | Takada et al. | |
| 11,260,575 B2 | 3/2022 | Kawamura et al. | |
| 11,478,973 B2 * | 10/2022 | Ogihara | B29C 49/4205 |
| 2001/0031291 A1 | 10/2001 | Takada et al. | |
| 2008/0042325 A1 | 2/2008 | Imatani et al. | |
| 2011/0146202 A1 | 6/2011 | Imatani et al. | |
| 2018/0304519 A1 | 10/2018 | Usami | |
| 2019/0152121 A1 | 5/2019 | Horigomi et al. | |
| 2019/0389117 A1 | 12/2019 | Horigome | |
| 2021/0394420 A1 | 12/2021 | Horigome | |

FOREIGN PATENT DOCUMENTS

| | | |
|---|---|---|
| CN | 108698300 A | 10/2018 |
| EP | 341 8027 A1 | 12/2018 |
| EP | 341 8027 B1 | 11/2020 |
| JP | 8-132517 A | 5/1996 |
| JP | 10-76567 A | 3/1998 |
| JP | 11-34152 A | 2/1999 |
| JP | 11-042698 A | 2/1999 |
| JP | 2010-52294 A | 3/2010 |
| JP | 6505344 B1 | 4/2019 |

OTHER PUBLICATIONS

International Preliminary Report on Patentability issued in issued in International Patent Application No. PCT/JP2020/034562, dated Mar. 15, 2022.
Supplementary European Search Report issued Aug. 30, 2023 in family member European patent application No. 20864178.7.
Office Action issued Apr. 22, 2023 in Chinese family member application No. 202080070788.7 and English language translation thereof.

* cited by examiner

METHOD FOR PRODUCING RESIN CONTAINER AND APPARATUS FOR PRODUCING RESIN CONTAINER

TECHNICAL FIELD

The present invention relates to a resin container manufacturing method and a resin container manufacturing apparatus.

BACKGROUND ART

Patent Literature 1 describes a hot parison type blow molding apparatus and a resin container manufacturing method using the blow molding apparatus. Patent Literature 2 describes a large container obtained by blow molding a bottomed tubular preform, which is obtained by injection molding a polyester resin, after temperature adjustment.

CITATION LIST

Patent Literature

Patent Literature 1: JP-A-H08-132517
Patent Literature 2: JP-A-H11-034152

SUMMARY OF INVENTION

Technical Problem

As the hot parison type blow molding apparatus, if a method of injection molding a plurality of preforms along a predetermined arrangement direction and conveying the preforms in a direction intersecting the arrangement direction to blow mold containers is adopted, a number ratio of preforms can be changed between the injection molding part and the blow molding part, and thus, there are advantages such as downsizing of a blow molding mold and local cooling of the preforms during conveying. However, in this method, when the injection molded preforms are divided into blow molding units (divided into the number of blow cavities) and intermittently conveyed to the blow molding part, a length of waiting time until reaching the blow molding part changes for each unit, which tends to cause a temperature difference between the preforms.

An object of the present invention is to provide a resin container manufacturing method and a resin container manufacturing apparatus that can stably manufacture high-quality containers by reducing a temperature condition difference between preforms even when a conveying method that tends to cause the temperature difference between preforms is adopted.

Another object of the present invention is to provide a resin container manufacturing method and a resin container manufacturing apparatus that ensure a uniform temperature between preforms and can stably manufacture high-quality containers even when a conveying method that tends to cause a temperature difference between preforms is adopted.

Solution to Problem

A resin container manufacturing method according to one aspect of the present invention, which can solve the above problem, includes:
an injection molding process of injection molding a plurality of preforms along a predetermined arrangement direction;
a temperature adjustment process of adjusting a temperature of the preform; and
a blow molding process of molding a resin container from the preform, in which
after the injection molding process, the preform and the container are conveyed along a conveying direction intersecting the arrangement direction over the temperature adjustment process and the blow molding process, and
the temperature adjustment process includes a first temperature adjustment process of adjusting the temperature of the preform, a second temperature adjustment process of adjusting the temperature of the preform under a condition different from that of the first temperature adjustment process, and a fine adjustment process of finely adjusting the temperature of the preform.

A resin container manufacturing apparatus according to one aspect of the present invention, which can solve the above problem, includes:
an injection molding part that injection molds a plurality of preforms along a predetermined arrangement direction;
a temperature adjustment part that adjusts a temperature of the preform; and
a blow molding part that molds a resin container from the preform, in which
the resin container manufacturing apparatus includes a conveying mechanism that conveys the preform and the container along a conveying direction intersecting the arrangement direction over the temperature adjustment part and the blow molding part, and
the temperature adjustment part includes a first temperature adjustment part that adjusts the temperature of the preform, a second temperature adjustment part that adjusts the temperature of the preform under a condition different from that of the first temperature adjustment part, and a fine adjustment part that finely adjusts the temperature of the preform.

A resin container manufacturing method according to one aspect of the present invention, which can solve the above problem, includes:
an injection molding process of injection molding a plurality of preforms along a predetermined arrangement direction;
a temperature adjustment process of adjusting a temperature of the preform; and
a blow molding process of molding a resin container from the preform, in which
after the injection molding process, the preform and the container are conveyed along a conveying direction intersecting the arrangement direction over the temperature adjustment process and the blow molding process, and
the temperature adjustment process includes a heat retention temperature adjustment process of preventing a temperature drop of the preform whose temperature has been adjusted.

A resin container manufacturing apparatus according to one aspect of the present invention, which can solve the above problem, includes:
an injection molding part that injection molds a plurality of preforms along a predetermined arrangement direction;
a temperature adjustment part that adjusts a temperature of the preform; and a blow molding part that molds a resin container from the preform, in which the resin container manufacturing apparatus includes a conveying mechanism that conveys the preform and the container along a conveying direction intersecting the arrangement direction over the temperature adjustment part and the blow molding part, and the temperature adjustment part includes a heat retention temperature adjustment part that prevents a temperature drop of the preform whose temperature has been adjusted.

Advantageous Effects of Invention

The present invention can provide a resin container manufacturing method and a resin container manufacturing apparatus that can stably manufacture high-quality containers by reducing a temperature condition difference between preforms even when a conveying method that tends to cause the temperature difference between preforms is adopted.

The present invention can also provide a resin container manufacturing method and a resin container manufacturing apparatus that ensure a uniform temperature between preforms and can stably manufacture high-quality containers even when a conveying method that tends to cause a temperature difference between preforms is adopted.

DESCRIPTION OF EMBODIMENTS

Figure 1:
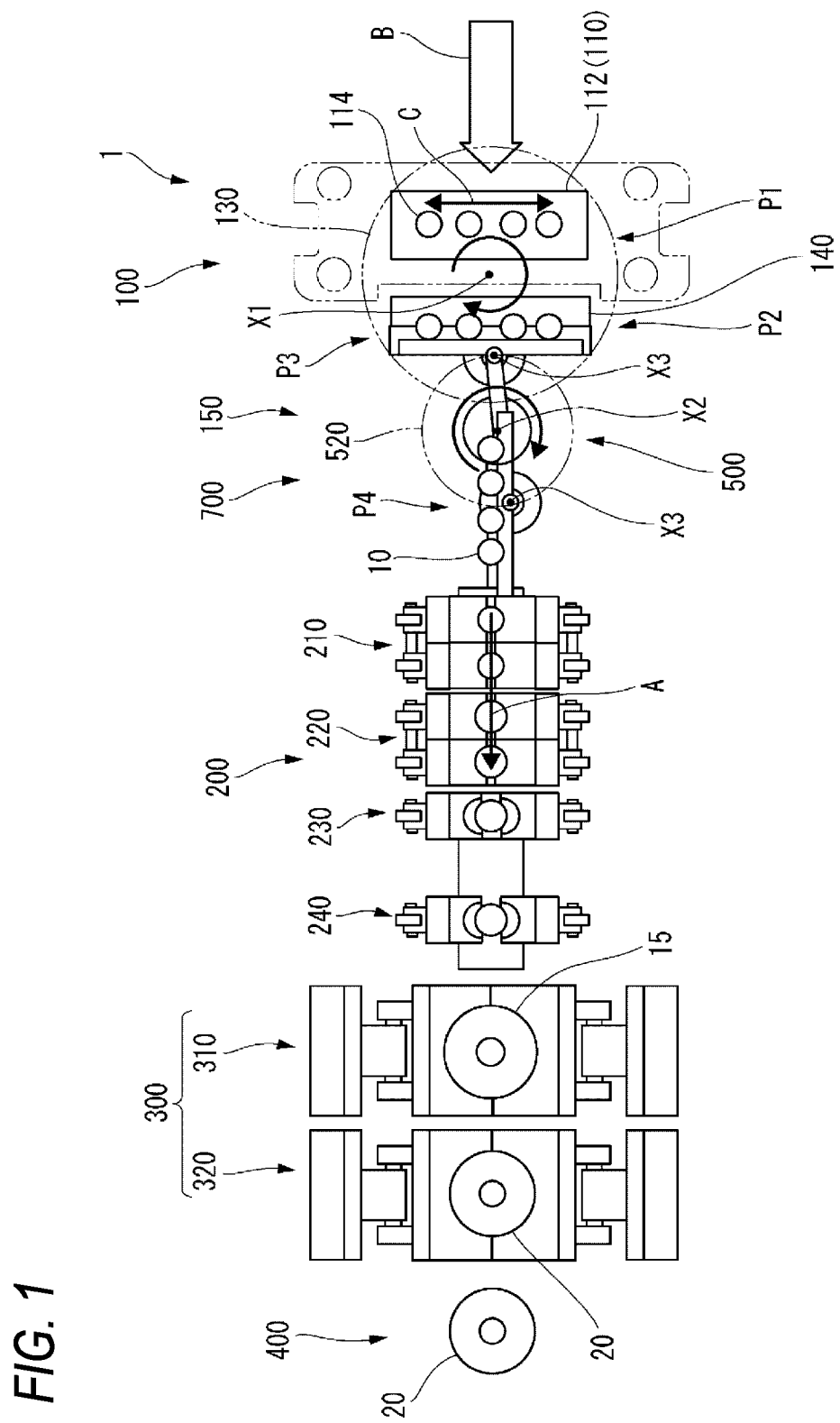
FIG. 1 is a schematic diagram in a plan view illustrating a resin container manufacturing apparatus according to an embodiment.

Hereinafter, an embodiment of the present invention will be described with reference to the drawings. Note that, for convenience of description, the dimensions of the respective members illustrated in the drawings may be different from the actual dimensions of the respective members.

Figure 2:
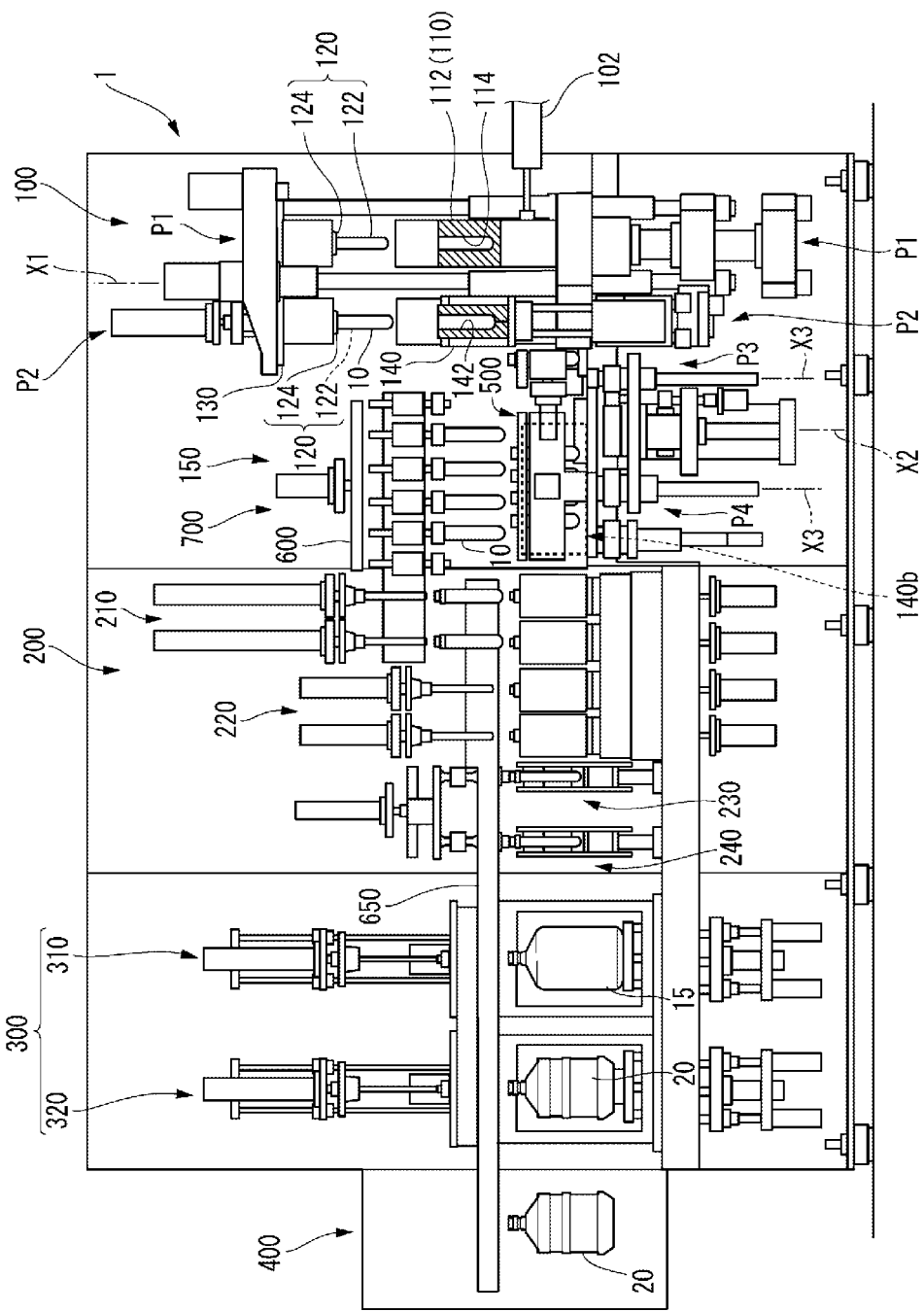
FIG. 2 is a schematic diagram in a side view illustrating the resin container manufacturing apparatus according to the embodiment.

FIG. 1 is a schematic diagram in a plan view illustrating a resin container manufacturing apparatus 1 according to the present embodiment. FIG. 2 is a schematic diagram in a side view illustrating the resin container manufacturing apparatus 1 according to the present embodiment. The manufacturing apparatus 1 is a so-called 4-station type molding apparatus, including: an injection molding part 100 that injection molds a plurality of preforms 10 along a predetermined arrangement direction C; a temperature adjustment part 200 that adjusts a temperature of the preform 10; a blow molding part 300 that molds a resin container 20 from the preform 10; and a take-out part 400 that takes out the molded container 20. The container 20 manufactured by the manufacturing apparatus 1 can be a large bottle such as a 5-gallon bottle. The manufacturing apparatus is a one-step type that uses a divided blow method.

In this example, in the manufacturing apparatus 1, the injection molding part 100, the temperature adjustment part 200, the blow molding part 300, and the take-out part 400 are arranged linearly. The manufacturing apparatus 1 includes conveying mechanisms 600 and 650 (not shown in FIG. 1) that convey the preform 10 and the container 20 along a conveying direction A intersecting the arrangement direction C over the temperature adjustment part 200 and the blow molding part 300. The manufacturing apparatus 1 is provided with a conversion part 150 between the injection molding part 100 and the temperature adjustment part 200. The conversion part 150 includes a conversion mechanism 500 that changes an alignment direction of the plurality of preforms 10 from the arrangement direction C to a direction along the conveying direction A.

The injection molding part 100 injection molds the plurality of preforms 10 so that the plurality of preforms 10 are aligned along the arrangement direction C. The injection molding part 100 includes at least one first injection mold 110 and at least two second injection molds 120. The first injection mold 110 includes an injection cavity mold 112 provided with a plurality of (for example, four) recesses 114 that define outer shapes of a body portion and a bottom portion of the preform 10. The first injection mold 110 is connected to an injection device 102 that injects a resin material, which is a raw material of the preform 10 (for example, polyester such as polyethylene terephthalate (PET), polycarbonate (PC), and the like), and the plurality of (for example, four) recesses 114 are linearly aligned in the arrangement direction C orthogonal to an injection direction B of the injection device 102. The arrangement direction C also intersects (is orthogonal to) the conveying direction A. The injection device 102 is connected to a central portion of the first injection mold 110 in the arrangement direction C. A refrigerant is caused to flow through the first injection mold 110 and the second injection molds 120 of the injection molding part 100. A temperature of the refrigerant is set to, for example, 5° C. to 20° C.

The two second injection molds 120 each include four injection core molds 122 and injection neck molds (neck molds) 124, which are arranged along the arrangement direction C, respectively. The injection core molds 122 define inner shapes of a neck portion, the body portion, and the bottom portion of the preform 10, and the injection neck molds 124 define an outer shape of the neck portion. The two second injection molds 120 are connected to a first rotating member 130, which is a rotation plate, and are located on a circumference centered on a first central axis X1, and the two second injection molds 120 are configured to be intermittently rotatable with respect to the first central axis X1. Specifically, the two second injection molds 120 are arranged at positions rotated by 180° from each other with respect to the first central axis X1. The first rotating member 130 is configured to intermittently rotate by 180° per cycle of the injection molding to swap the positions of the two second injection molds 120 with each other.

One of the second injection molds 120 is arranged at a position where the first injection mold 110 is arranged (injection position P1), and the other one of the second injection molds 120 is arranged at a position rotated by 180° on an opposite side of the injection position P1 with respect to the first central axis X1 (post-cooling position P2). The post-cooling position P2 is a position where the preform 10 injection molded at the injection position P1 is held and cooled by the injection core molds 122 and the injection neck molds 124. The post-cooling position P2 is provided with a cooling pod 140 that can accommodate the preform 10 and can be raised and lowered. The cooling pod 140 is provided with a cavity 142 that accommodates the preform 10 and a flow path for a refrigerant such as water is provided around the cavity 142, and the cooling pod 140 is a member capable of cooling the preform 10 from outside. The cooling pod 140 is set to a temperature of, for example, 5° C. to 60° C., and preferably 5° C. to 20° C.

In other words, the injection molding part 100 includes an injection part that is a part located at the injection position P1 and a post-cooling part that is a part located at the post-cooling position P2. The injection part injects molten resin into a cavity to mold the preform 10. The post-cooling part cools the preform 10 molded at the injection part and released from the cavity.

Figure 3:
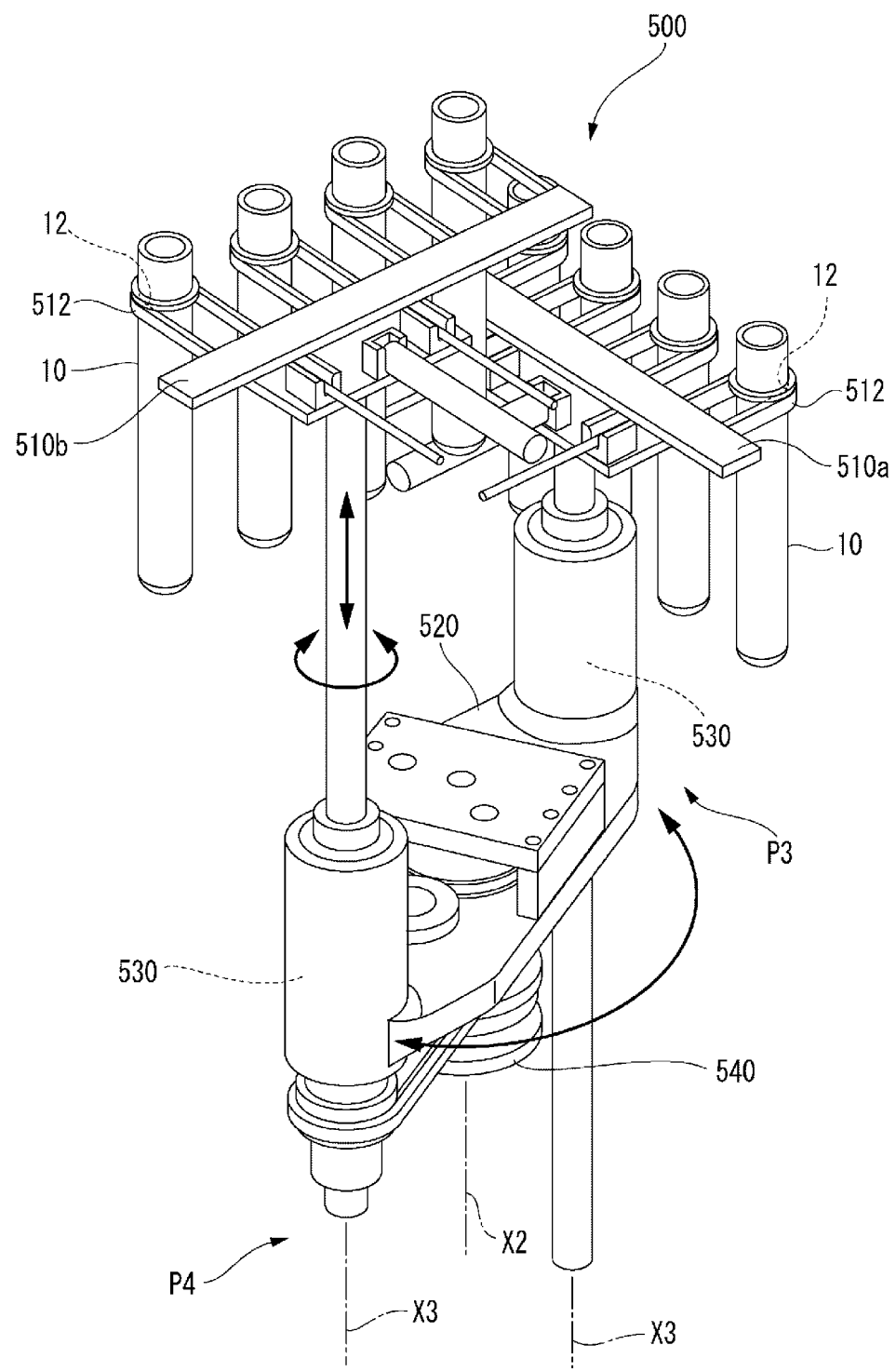
FIG. 3 is a diagram illustrating a conversion mechanism according to the embodiment.

Next, the conversion mechanism 500 of the conversion part 150 will be described with reference to FIG. 3. FIG. 3 is a perspective view illustrating an outline of the conversion mechanism 500. The conversion mechanism 500 includes holding members 510a and 510b (for example, a hand member or a chuck member) configured to hold the preform 10, a second rotating member 520 which is a moving mechanism configured to move the holding members 510a and 510b, and two holding member conversion mechanisms 530 (for example, an electric motor) configured so that the holding members 510a and 510b can be changed in direction while the holding members 510a and 510b are moved. A second cooling pod 140b constituted by a pair of split molds capable of accommodating the preform 10 may be provided at a sending position P4, which will be described later, of the conversion mechanism 500. The second cooling pod 140b is set to, for example, 5° C. to 60° C., and is preferably set to a temperature higher than that of the first cooling pod 140.

The holding members 510a and 510b include a holding part 512 (for example, a claw or a hand) that grips and holds a neck portion 12 of the preform 10. The holding members 510a and 510b are configured so that the preform can be moved up and down, that is, can be raised and lowered. The holding part 512 is configured to be slidable in a horizontal direction with respect to the holding member 510a (510b). The holding member 510a (510b) is configured to be able to move up and down with respect to the second rotating member 520.

The second rotating member 520 is configured to be rotated by a rotating mechanism 540 (for example, an electric motor) around a second central axis X2. In other words, the second rotating member 520 is configured to move the holding members 510a and 510b from a receiving position P3 for receiving the plurality of injection-molded preforms 10 in the injection molding part 100 to a sending position P4 for sending the preforms 10 to the temperature adjustment part 200. The holding members 510a and 510b are supported by the second rotating member 520 at positions rotated by 180° from each other with respect to the second central axis X2 on the second rotating member 520. The two holding member conversion mechanisms 530 are provided on the second rotating member 520 so as to correspond to the holding members 510a and 510b, respectively. The post-cooling position P2 and the receiving position P3 are arranged so as to overlap each other in the vertical direction (up-down direction) of the manufacturing apparatus 1. When the second cooling pod is provided, a second post-cooling position and the sending position P4, which will be described later, may be arranged so as to overlap each other in the vertical direction (up-down direction) of the manufacturing apparatus 1.

The holding member conversion mechanisms 530 are configured to change the alignment direction of the plurality of preforms 10 from the arrangement direction C to a direction along the conveying direction A by rotating the holding members 510a and 510b on their own axes while moving the holding members 510a and 510b. That is, the holding members 510a and 510b are configured to be capable of intermittently rotating (rotating on their own axes) by 90° around a third central axis X3 by the holding member conversion mechanisms 530.

Figure 4:
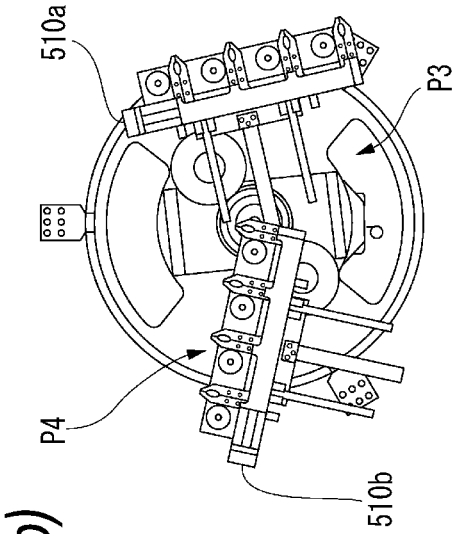
FIGS. 4(a)-(d) illustrate operations of the conversion mechanism according to the embodiment.
Figure 4:
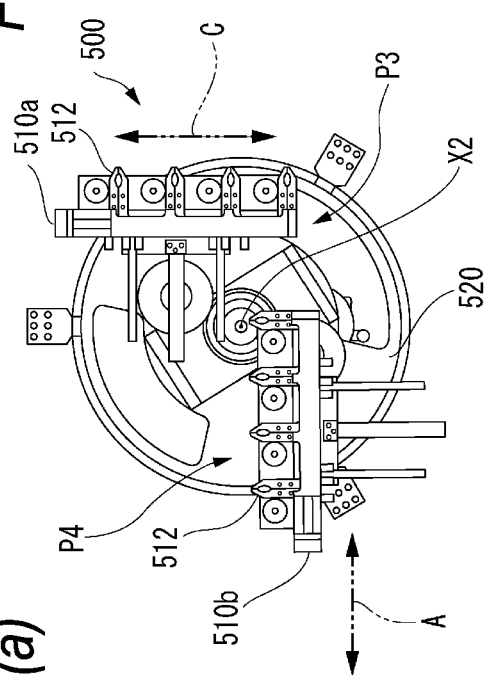
Figure 4:
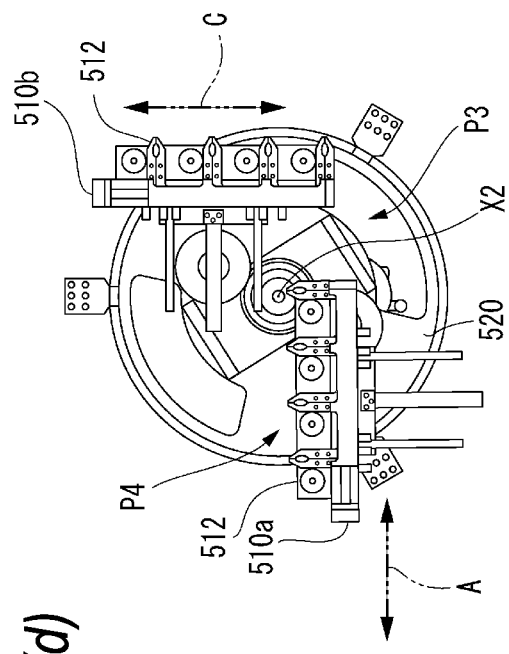
Figure 4:
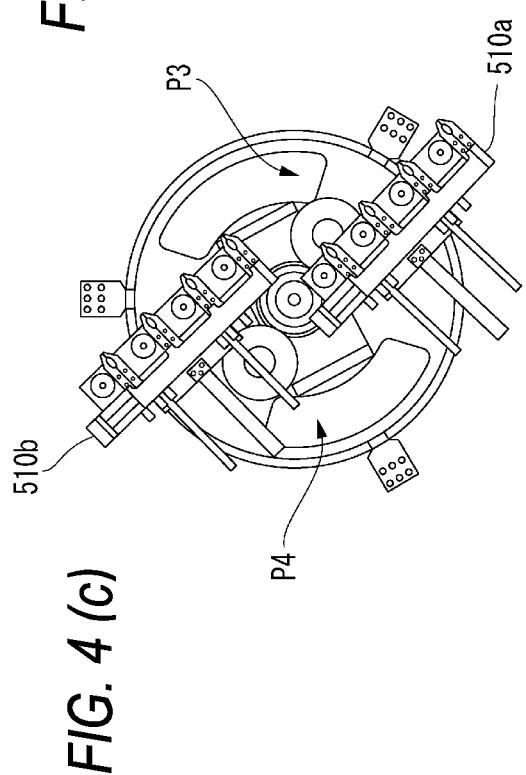

Here, operations of the conversion mechanism 500 will be described in detail with reference to FIG. 4. FIG. 4 is a diagram illustrating the operations of the conversion mechanism 500. Although the conversion mechanisms 500 in FIGS. 3 and 4 do not always match with each other, they are common in the configurations described above, and the operation will be described with reference to FIG. 4 for convenience. In FIG. 4, (a) shows an initial state of the conversion mechanism 500, (b) shows a primary state of the conversion mechanism 500, (c) shows a secondary state of the conversion mechanism 500, and (d) shows a tertiary state of the conversion mechanism 500.

In the initial state shown in (a) of FIG. 4, the holding member 510a is arranged at the receiving position P3, and a plurality of holding parts 512 are arranged so as to be aligned in a direction along the arrangement direction C in the injection molding part 100. In the initial state, the holding member 510b is arranged at the sending position P4, and a plurality of holding parts 512 are arranged so as to be aligned in a direction along the conveying direction A.

Next, the conversion mechanism 500 transitions to the primary state shown in (b) of FIG. 4 and then the secondary state shown in (c) of FIG. 4. When transitioning from the initial state to the primary state and then to the secondary state, the second rotating member 520 rotates clockwise, and the holding member 510a and the holding member 510b are exchanged in position. When transitioning from the initial state to the primary state and then to the secondary state, the holding member 510a rotates counterclockwise on its own axis, and the holding member 510b rotates clockwise on its own axis. Then, when transitioning to the tertiary state shown in (d) of FIG. 4, the second rotating member 520 rotates 180° and stops. When transitioning to the tertiary state, the holding member 510a and the holding member 510b rotate 90° in opposite directions and stop. In the tertiary state, the holding member 510a is arranged at the sending position P4, and the plurality of holding parts 512 are arranged so as to be aligned in a direction along the conveying direction A. In the tertiary state, the holding member 510b is arranged at the receiving position P3, and the plurality of holding parts 512 are arranged so as to be aligned in a direction along the arrangement direction C in the injection molding part 100. When the second cooling pod is provided, the second cooling pod 140b accommodates and holds the preform 10 at the sending position P4.

Next, the positions of the holding member 510a and the holding member 510b are exchanged from the tertiary state to the secondary state and then the primary state, by operations which are opposite to the above-mentioned operations. That is, the second rotating member 520 rotates counterclockwise, the holding member 510a rotates clockwise on its own axis, and the holding member 510b rotates counterclockwise on its own axis. In this way, the conversion mechanism 500 returns to the initial state. By repeating the above operations, the holding member 510a and the holding member 510*b* are exchanged in position, and the preform 10 is transferred from the injection molding part 100 to the temperature adjustment part 200. The second rotating member 520 has a rotation mode of switching between clockwise and counterclockwise every time it rotates by 180°, but may also have a mode in which the direction of rotation is fixed clockwise or counterclockwise and the rotation is performed intermittently by 180°.

Here, one preform located at one end of the plurality of preforms along the arrangement direction C in the injection molding part 100 is defined as a first preform and one preform located at another end is defined as an N1st preform (N1 is an integer of 2 or more). In the conversion mechanism 500, when the holding members 510*a* and 510*b* are moved from the receiving position P3 to the sending position P4, they both rotate counterclockwise on their own axes to change an alignment direction of the holding parts 512 from the arrangement direction C to the conveying direction A. When the holding members 510*a* and 510*b* are moved from the receiving position P3 to the sending position P4, directions in which they rotate and move are different, but directions in which they rotate on their own axes are the same. That is, the conversion mechanism 500 is configured to be capable of changing the alignment direction of the plurality of preforms 10 from the arrangement direction C to a direction along the conveying direction A, so that the first preform (or the N1st preform) is always at the front.

Here, returning to FIGS. 1 and 2, the manufacturing apparatus 1 will be described. When the preform 10 is held by the conversion mechanism 500 between the injection molding part 100 and the temperature adjustment part 200, the preform is naturally cooled in the atmosphere. In other words, the manufacturing apparatus 1 includes a natural cooling part 700 between the injection molding part 100 and the temperature adjustment part 200. The above-mentioned conversion part 150 is provided in the natural cooling part 700. Here, the term "natural cooling" used herein does not mean cooling to room temperature, but means natural cooling in the atmosphere.

The conveying mechanisms 600 and 650 are separately provided. The conveying mechanism 600 is configured to receive the preform 10 arranged at the sending position P4 of the conversion mechanism 500 and convey the preform 10 to the temperature adjustment part 200. The conveying mechanism 650 is configured to receive the preform 10 conveyed to the temperature adjustment part 200 by the conveying mechanism 600, and convey the preform 10 and the container 20 along the conveying direction A over the temperature adjustment part 200, the blow molding part 300, and the take-out part 400. As the conveying mechanisms 600 and 650, for example, a translational movement chuck (hand) may be adopted. Conveying of the preform between the conversion mechanism 500 and the conveying mechanism 600 and between the conveying mechanism 600 and the conveying mechanism 650 can be carried out by means known in the art to which the present invention belongs, so detailed explanation thereof is omitted. The conveying by the conveying mechanisms 600 and 650 is performed intermittently. An interval (pitch) between the preforms 10 and the containers 20 can be changed on half way. For example, the conveying mechanism 600 is configured so that an interval (pitch) P1 of the injection molding part 100 can be converted to an interval P2 of the temperature adjustment part 200 (P1<P2), and the transfer mechanism 650 is configured so that the interval P2 of the temperature adjustment part 200 can be converted to an interval P3 of the blow molding part 300 (P2<P3). Further, the conveying mechanism 650 is configured to convert the number of the preforms 10 and the containers 20 to be conveyed by one intermittent conveying in the middle of a conveying path. Specifically, the conveying mechanism 650 is configured to intermittently convey two preforms to a heat retention temperature adjustment part 230 and a fine adjustment part 240, which will be described later, and thereafter intermittently convey the preform and the container one by one.

The temperature adjustment part 200 includes a first temperature adjustment part 210 that adjusts the temperature of the preform, a second temperature adjustment part 220 that adjusts the temperature of the preform 10 under a condition different from that of the first temperature adjustment part 210, the heat retention temperature adjustment part 230 that prevents a temperature drop of the temperature-adjusted preform 10, and the fine adjustment part 240 that finely adjusts the temperature of the preform 10.

A condition for adjusting the temperature of the preform 10 in the first temperature adjustment part 210 has a higher ability to lower the temperature of the preform 10 than a condition for adjusting the temperature of the preform 10 in the second temperature adjustment part 220. Here, the "higher ability to lower the temperature" means that the preform 10 can be cooled more rapidly than a comparison target. More specifically, it means that a temperature range of the preform to be lowered per unit time is large. For example, when the preform 10 is molded from polyethylene terephthalate, in the first temperature adjustment part 210, the temperature of the preform 10 may be adjusted from a state where an average temperature of the preforms 10 is 135° C. to 160° C. to a state where the average temperature is 120° C. to 130° C., and in the second temperature adjustment part 220, the temperature of the preform 10 may be adjusted from a state where the average temperature of the preforms 10 is 120° C. to 130° C. to a state where the average temperature is 110° C. to 120° C.

As the first temperature adjustment part 210 and the second temperature adjustment part 220, various temperature adjustment means, such as a method of sandwiching the preform between a temperature adjustment cavity mold and a temperature adjustment core mold (temperature adjustment rod mold), a method of blowing air onto the preform, various infrared heaters, a RED method, and an electromagnetic wave heating method, can be adopted. As a preferred embodiment, the first temperature adjustment part 210 includes a temperature adjustment core mold and a temperature adjustment cavity mold configured to adjust the temperature of the preform 10 by sandwiching the preform 10 therebetween, and the second temperature adjustment part 220 includes a temperature adjustment blow core mold that adjusts the temperature of the preform 10 by blowing a gas onto the preform 10 and optionally includes a temperature adjustment cavity mold that accommodates the preform 10. In the preferred embodiment, a preliminary blow may be performed in the second temperature adjustment part 220 to slightly inflate the preform 10 before conveying the preform 10 to the blow molding part 300.

As another preferred embodiment, the first temperature adjustment part 210 may adopt a method for adjusting the temperature of the preform 10 from inside by convection by supplying and blowing gas to an inside of the preform 10 accommodated in the temperature adjustment cavity side by the temperature adjustment blow core mold, and continuously discharging the blown gas to an outside of the preform. As another preferred embodiment, the second temperature adjustment part 220 may adopt a method for preliminary blowing the preform 10 by supplying and blowing gas to the inside of the preform 10 accommodated in the temperature adjustment cavity side by the temperature adjustment blow core mold without discharging the gas to the outside of the preform 10 during blowing.

In the above-mentioned first temperature adjustment part 210 and second temperature adjustment part 220, the outside of the preform 10 may be brought into contact with the temperature adjustment cavity mold, and the temperature of the preform 10 may be adjusted from outside by heat conduction. A space (cavity) of the temperature adjustment cavity accommodating the preform 10 may be set larger in the second temperature adjustment part 210 than in the first temperature adjustment part 210. The first temperature adjustment part 210 and the second temperature adjustment part 220 are configured so that the temperature adjustment of two preforms can be performed respectively. A temperature adjustment medium (cooling medium) is flowed through the temperature adjustment cavity mold and the temperature adjustment core mold of the first temperature adjustment part 210 and the second temperature adjustment part 220. In this case, a temperature of the cooling medium is set to, for example, 40° C. to 100° C., preferably 50° C. to 70° C.

The heat retention temperature adjustment part 230 is set to a temperature close to a blow optimum temperature at a uniform temperature as a whole so as to prevent the temperature of the preform 10 which has been temperature-adjusted to a temperature close to a temperature suitable for blow molding from dropping. As the heat retention temperature adjustment part 230, various temperature adjustment methods, such as various infrared heaters, a RED method, and an electromagnetic wave heating method can be adopted. The heat retention temperature adjustment part 230 is configured to be capable of adjusting the temperature of one preform (specifically, preventing a temperature drop of the preform).

The fine adjustment part 240 finely adjusts the temperature of the preform 10 to a temperature suitable for blow molding. Here, "finely adjust" means finely adjusting the temperature of the whole preform 10 to a temperature suitable for blow molding. Specifically, "finely adjust" means, for example, that the temperature of the preform is intentionally made different for each part according to a shape of the container, or that the temperature unevenness for each part of the preform 10 is finely adjusted. The fine adjustment part 240 may be a local temperature adjustment part that locally adjusts the temperature of the preform 10. The fine adjustment part 240 may adopt a temperature adjustment method such as an infrared heater method, a RED method, an electromagnetic wave heating method, and an air cooling method. The fine adjustment part 240 is arranged immediately before the blow molding part 300. The fine adjustment part 240 is configured to be able to perform heating or cooling so that the temperature of one preform can be adjusted. The fine adjustment part 240 may also be configured to carry out a heating treatment and a cooling treatment at the same time so that a lower part of the body portion from a central part of the body portion can be cooled while an upper part of the body portion (immediately below the neck portion) of the preform 10 is locally heated.

Next, the blow molding part 300 will be described. In this example, the blow molding part 300 includes a primary blow part 310 and a final blow part 320, and is configured to blow mold the container 20 in two stages. The primary blow part 310 includes a primary blow mold constituted by, for example, a stretch rod, a blow core mold, and a blow cavity mold. The primary blow part 310 is configured so that an intermediate molded product 15 can be molded by introducing air while stretching the preform 10 with, for example, the stretch rod. The final blow part 320 includes a final blow mold constituted by, for example, a blow core mold and a blow cavity mold, and if necessary, a stretch rod. The final blow part 320 is configured so that the container 20 can be molded by, for example, stretching the intermediate molded product 15 by air. The blow cavity mold of the primary blow part 310 may be set to a temperature (for example, 110° C. to 140° C.) higher than a temperature (for example, 60° C. to 90° C.) of the blow cavity mold of the final blow part 320 in order to perform heat treatment on the intermediate molded product 15.

Figure 5:
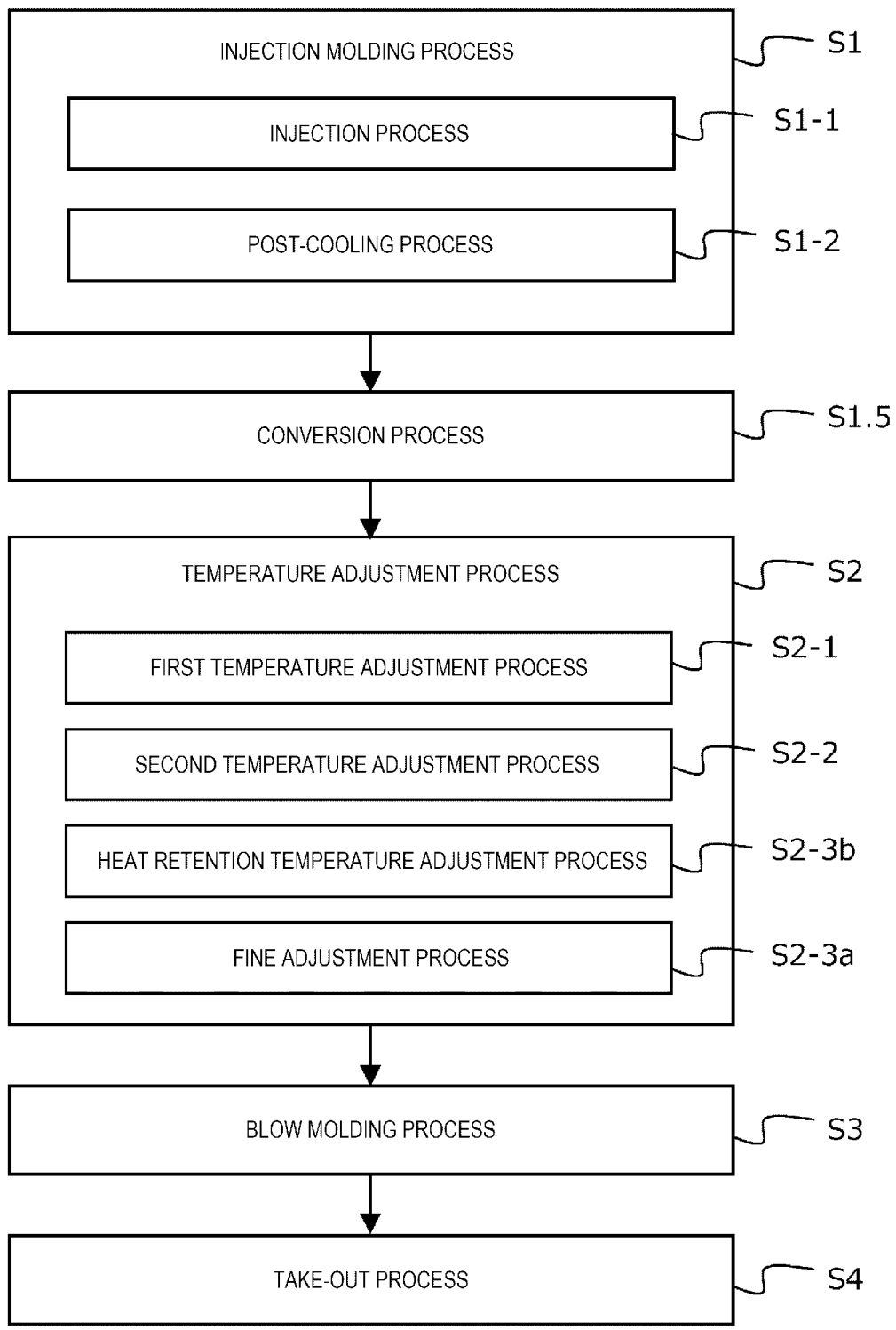
FIG. 5 is a flowchart of a container manufacturing process according to the embodiment.

Next, a manufacturing method for manufacturing the container 20 by the manufacturing apparatus 1 will be described. FIG. 5 is a flowchart of a manufacturing process of the container 20. As shown in FIG. 5, the container 20 is manufactured by an injection molding process S1 of injection molding the plurality of preforms 10 along the arrangement direction C, a conversion process S1.5 of changing the alignment direction of the plurality of preforms 10 from the arrangement direction C to a direction along the conveying direction A, a temperature adjustment process S2 of adjusting the temperature of the preform 10, and a blow molding process S3 of molding the container 20 from the preform 10, and the container 20 is taken out from the manufacturing apparatus 1 in a take-out process S4. Hereinafter, the manufacturing method for manufacturing the container 20 will be described with reference to FIG. 2.

The injection molding process S1 includes an injection process S1-1 and a post-cooling process S1-2. In the injection process S1-1, molten resin is injected into an injection cavity formed by mold clamping the injection cavity mold 112, the injection core mold 122, and the injection neck mold 124, by the injection device 102 to form the preform 10. After a predetermined time has elapsed since the injection, the preform 10 is demolded (released) from the injection cavity mold 112, and the first rotating member 130 is rotated by 180° to move the preform 10 held by the injection core mold 122 and the injection neck mold 124 from the injection position P1 to the post-cooling position P2.

Subsequently, in the post-cooling process S1-2, the preform 10 held by the injection core mold 122 and the injection neck mold 124 which are moved to the post-cooling position P2 is cooled for a predetermined time. The cooling of the preform 10 is performed from the inside by the injection core mold 122 and the injection neck mold 124, in which a refrigerant such as water flows. After the preform 10 is moved to the post-cooling position P2, the cooling pod 140 is raised to accommodate the preform in the cooling pod 140. The cooling pod 140 also cools the preform 10 from the outside. In this case, in order to improve a cooling efficiency of the post-cooling process S1-2, the body portion of the preform 10 may be sandwiched between the injection core mold 122 and the cooling pod 140 to be strongly adhered (pressed and deformed). Here, even when the preform 10 is moved from the injection position P1 to the post-cooling position P2, the preform 10 is cooled from the inside via the injection core mold 122a (122b), so that this movement time can also be regarded as a part of the initial post-cooling process S1-2.

During the post-cooling process S1-2 of cooling the preform 10 held by the injection core mold 122 and the injection neck mold 124 at the post-cooling position P2, the next injection process S1-1 is performed by another injection core mold 122 and another injection neck mold 124 arranged at the injection position P1. That is, the next injection process S1-1 and the post-cooling process S1-2 are performed in parallel. After a predetermined time, the preform 10 is demolded from the injection core mold 122 and the injection neck mold 124 and is accommodated in the cooling pod 140. Subsequently, the cooling pod 140 is lowered to a height at which the conversion mechanism 500 can receive the preform 10. After that, the first rotating member 130 is rotated again to perform the next injection process S1-1 and the post-cooling process S1-2. By repeating these processes, the injection molding process S1 is continuously performed.

Next, in the conversion process S1.5, the preform 10 accommodated in the cooling pod 140 and aligned in the arrangement direction C are held by the holding member 510a (510b) of the conversion mechanism 500 arranged at the receiving position P3. After that, the cooling pod 140 is further lowered to make the preform 10 rotatable by the second rotating member 520. Then, by rotating the second rotating member 520, the preform 10 is moved from the receiving position P3 to the sending position P4. During this time, the holding member 510a (510b) is rotated on its own axis so that the preforms 10 are aligned in an extending direction of the conveying direction A. Then, the holding member 510a (510b) is raised, the preform 10 is held by the conveying mechanism 600, and the preform 10 is released from the holding member 510a (510b). Next, the conveying mechanism 600 intermittently sends out two preforms 10 to the temperature adjustment part 200, and the temperature adjustment part 200 delivers the preform 10 from the conveying mechanism 600 to the conveying mechanism 650. During the conversion process S1.5, the preform 10 is naturally cooled in the atmosphere. As a result, the temperature of the preform 10 is made uniform before it is conveyed to the temperature adjustment part 200 (natural cooling process). If necessary, a second post-cooling process of the preform 10 is performed at the sending position P4. As a result, whitening (crystallization) due to slow cooling of the preform 10 formed by a crystalline resin material (PET), which tends to occur during natural cooling, can be prevented.

While the preform 10 is being sent out by the conveying mechanism 600, the preform 10 to be molded by the next injection molding process S1 is held by the holding member 510b (510a). After the sending of the preform 10 in the conveying direction A at the sending position P4 is completed, by rotating the second rotating member 520, the preform 10 molded by the next injection molding process S1 is moved from the receiving position P3 to the sending position P4. By repeating this process, the conversion process S1.5 is continuously performed.

After the preform 10 is conveyed to the temperature adjustment part 200, the preform 10 is conveyed in the temperature adjustment part 200 by the conveying mechanism 650, and then the temperature adjustment process S2 is performed. In the temperature adjustment process S2, the preform 10 is sequentially conveyed to the first temperature adjustment part 210, the second temperature adjustment part 220, the heat retention temperature adjustment part 230, and the fine adjustment part 240, and the temperature of the preform 10 is adjusted to a temperature suitable for the next blow molding process S3. That is, the temperature adjustment process S2 includes a first temperature adjustment process S2-1, a second temperature adjustment process S2-2, a heat retention temperature adjustment process S2-3b, and a fine adjustment process S2-3a. The heat retention temperature adjustment process S2-3b and the fine adjustment process S2-3a are provided as necessary and may be omitted. However, by providing the heat retention temperature adjustment process S2-3b, the temperature can be made uniform with high accuracy, and by providing the fine adjustment process S2-3a, the shape of the container can be easily controlled.

In the first temperature adjustment process S2-1, the preform 10 is sandwiched between the temperature adjustment core mold and the temperature adjustment cavity mold of the first temperature adjustment part 210 so that the temperature of the preform 10 is adjusted. In the second temperature adjustment process S2-2, the temperature of the preform 10 is adjusted by blowing gas on the preform 10 appropriately accommodated in the temperature adjustment cavity mold by the temperature adjustment blow core mold of the second temperature adjustment part 220.

However, in another example, in the first temperature adjustment part 210 in the first temperature adjustment process S2-1, the temperature of the preform 10 may be adjusted from the inside by convection by supplying and blowing gas to the inside of the preform 10 accommodated in the temperature adjustment cavity side by the temperature adjustment blow core mold and continuously discharging the blown gas to the outside of the preform. Further, in another example, in the second temperature adjustment part 220 in the second temperature adjustment process S2-2, the preform 10 may be preliminary blown by supplying and blowing gas to the inside of the preform 10 accommodated in the temperature adjustment cavity side by the temperature adjustment blow core mold without discharging the gas to the outside of the preform 10 during blowing.

In the above-mentioned first temperature adjustment process S2-1 and second temperature adjustment process S2-2, the outside of the preform 10 may be brought into contact with the temperature adjustment cavity mold, and the temperature of the preform 10 may be adjusted from the outside by heat conduction. The space (cavity) of the temperature adjustment cavity accommodating the preform 10 may be set larger in the second temperature adjustment process S2-2 than in the first temperature adjustment process S2-1.

In the heat retention temperature adjustment process S2-3b, the heat retention temperature adjustment part 230 maintains the temperature of the preform 10 adjusted by the first temperature adjustment process S2-1 and the second temperature adjustment process S2-2. In the fine adjustment process S2-3a, the fine adjustment part 240 finely adjusts the temperature of the preform 10 to a temperature suitable for blow molding. In the present embodiment, two preforms 10 are intermittently conveyed to the heat retention temperature adjustment part 230 and the fine adjustment part 240, and thereafter the preform 10 and the container 20 are intermittently conveyed one by one. That is, one of the two preforms 10 conveyed to the heat retention temperature adjustment part 230 and the fine adjustment part 240 is conveyed to the fine adjustment process S2-3a without going through the heat retention temperature adjustment process S2-3b.

After the fine adjustment process S2-3a of the temperature adjustment process S2, the preform 10 is conveyed to the blow molding part 300 by the conveying mechanism 650, and the blow molding process S3 is performed. In the blow molding process S3, the preform 10 is shaped into the intermediate molded product 15 by the primary blow part 310 (primary blow process), and the intermediate molded product 15 is shaped into the container 20 by the final blow part 320 (final blow process). After the blow molding process S3, the container 20 is conveyed to the take-out part 400 by the conveying mechanism 650, and the container 20 is taken out. Through these processes, the container 20 can be obtained. Except for the fine adjustment process S2-3a, the average temperature of the preform 10 is adjusted to gradually decrease over the injection molding process S1, the conversion process S1.5, and the temperature adjustment process S2. That is, as shown in Patent Literature 2, the blow molding process S3 is performed by using only residual heat in the preform 10 obtained by the injection molding process S1 without reheating the preform in the temperature adjustment process S2.

Figure 6:
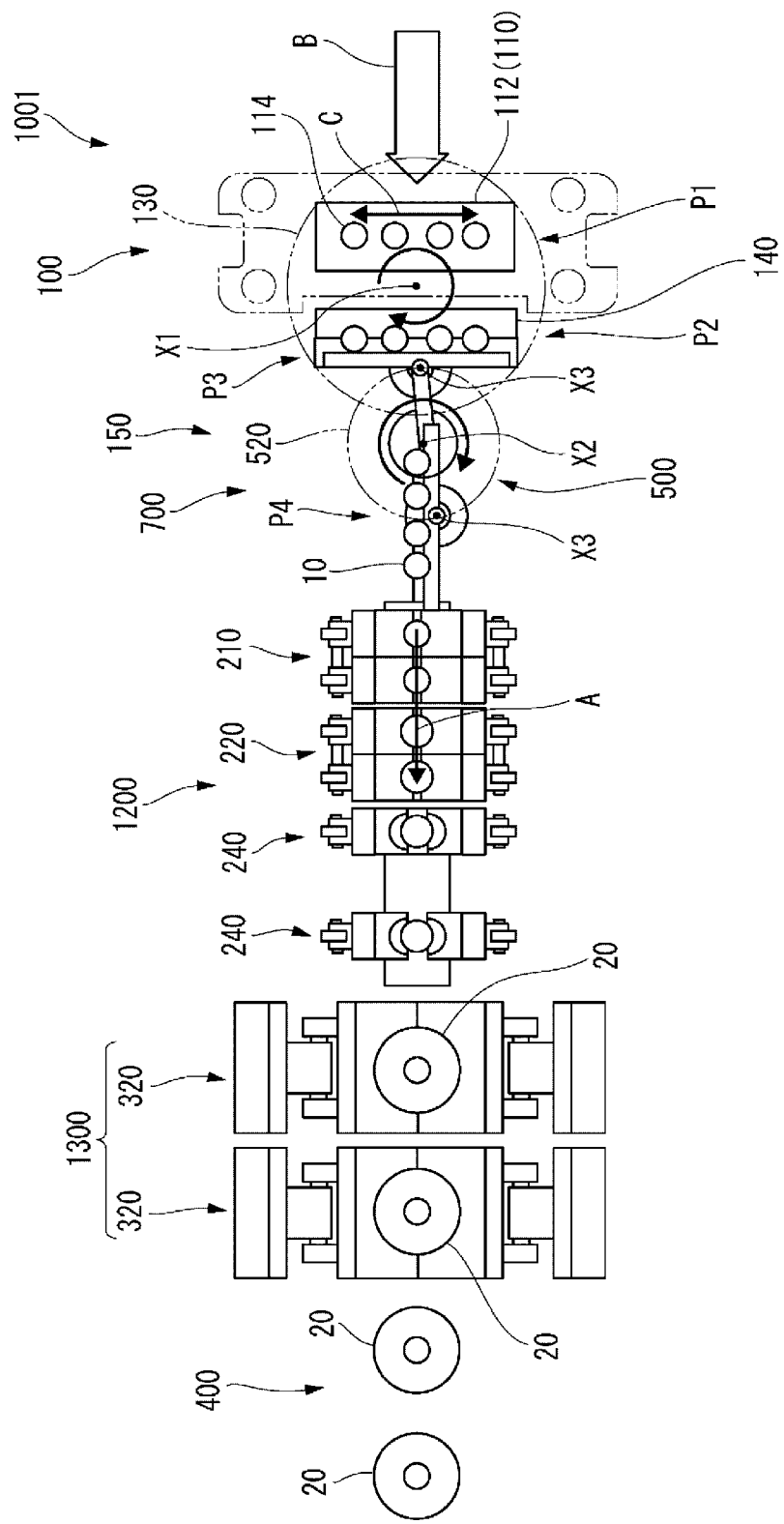
FIG. 6 is a schematic diagram in a plan view illustrating a resin container manufacturing apparatus according to a modification of the embodiment.
Figure 7:
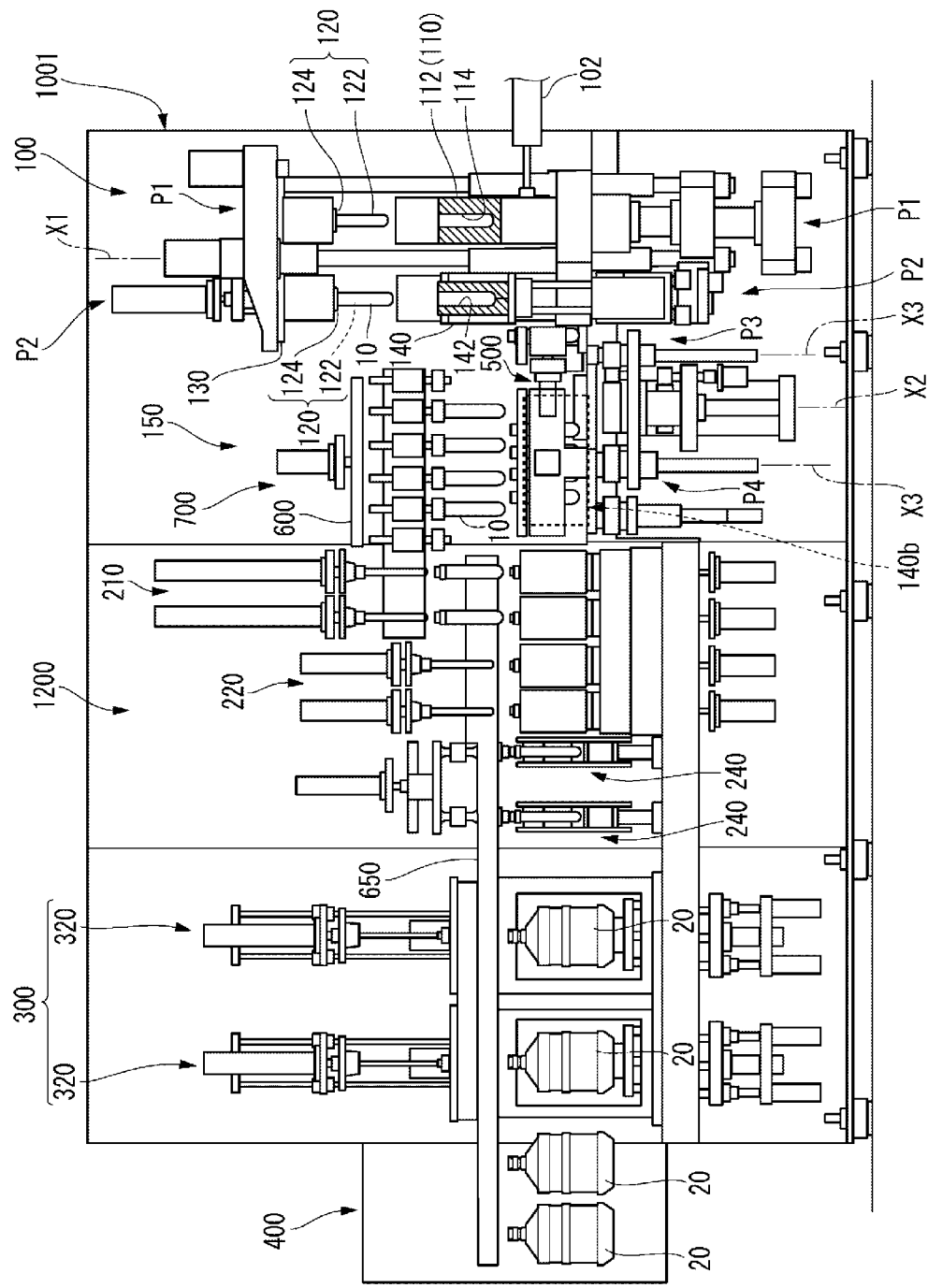
FIG. 7 is a schematic diagram in a side view illustrating the resin container manufacturing apparatus according to the modification of the embodiment.

Hereinafter, a modification of the above embodiment will be described with reference to FIGS. 6 and 7. Since the modification is the same as the above-described embodiment except for differences in configurations of the temperature adjustment part 200, the conveying mechanism 650, and the blow molding part 300, overlapping parts are designated by the same reference numerals and descriptions thereof will be omitted.

A manufacturing apparatus 1001 according to the modification includes a conveying mechanism 1650 configured to intermittently convey the preform 10 and the container 20 from a temperature adjustment part 1200 to a blow molding part 1300, two by two. The manufacturing apparatus 1001 includes a temperature adjustment part 1200 provided with the first temperature adjustment part 210 and the second temperature adjustment part 220, and provided with two fine adjustment parts 240 instead of the heat retention temperature adjustment part. The manufacturing apparatus 1001 includes a blow molding part 1300, which is provided with two final blow parts 320 including a stretch rod, a blow core mold, and a blow cavity mold, instead of the primary blow part, and is configured to be able to blow mold two containers 20 at one time. Therefore, the manufacturing apparatus 1001 can manufacture two containers 20 at the same time in the blow molding process S3. A temperature of the blow cavity mold provided in the final blow part 320 of the blow molding part 1300 according to the modification may be set to room temperature (for example, 10° C. to 20° C.).

As in the above modification, in the present disclosure, the configuration can be changed according to the number of blow-molded products. In the manufacturing apparatus 1 and 1001 of the present disclosure, the number of containers (N2) to be blow-molded at one time is smaller than the number of preforms (N1) to be injection-molded at one time. For example, the number of each molded product may be container:preform=1:4 or 2:4 or 2:6 (a ratio of N2 to N1 may be changed according to specifications of the container to be manufactured). In the manufacturing apparatuses 1 and 1001 of the present disclosure, the blow molding parts 300 and 1300 include the final blow part 320 that blow-molds N2 (N2 is an integer of 1 or more) containers 20 each time, and in the blow molding parts 300 and 1300, the preform 10 and the container 20 are intermittently conveyed by N2 pieces. In a case where one preform located at one end of the plurality of preforms 10 along the arrangement direction C in the injection molding part 100 is defined as a first preform and one preform located at another end is defined as an N1st preform (N1 is an integer of 2 or more), N1 and N2 satisfy a relationship of N1>N2. Since the number of containers to be taken when molding the container in the blow molding process is small, the number of blow molding molds is reduced, and space saving of the manufacturing apparatus can be achieved.

In order to achieve a high cycle, a technique is developed in which a cooling time of the preform in the injection molding process, which is a rate-determining stage, is shortened and the preform is demolded at a high temperature, and the preform is additionally cooled in a temperature adjustment process on a downstream side (Japanese Patent No. 6505344). The technique is applied to an intermittent rotary conveying type or intermittent linear conveying type hot parison type blow molding apparatus. Here, unlike the intermittent rotary conveying type, the intermittent linear conveying type can change the ratio of the injection molding part to the blow molding part, and has advantages such as downsizing of the blow molding mold and local cooling of the preform during intermittent conveying. However, since the injection molded preforms are usually divided into blow molding units (divided into the number of blow cavities) and intermittently conveyed to the blow molding part, there is also a disadvantage that a length of waiting time until reaching the blow molding part changes for each unit, which tends to cause a temperature difference between the preforms. Depending on a type of the container, a ratio of the number of injection moldings to the number of blow moldings may be appropriately changed to, for example, 2:1, 3:1, or 4:1. At the ratio of 4:1, a temperature difference between the preforms blown at the beginning and the end is even more notable.

The manufacturing method (manufacturing apparatus) of the present invention is a hot parison type blow molding method (manufacturing apparatus), and has a configuration in which the injection-molded N1 preforms are divided into units of the blow molding number N2 (number of the blow cavities) and intermittently conveyed to the blow molding process, and a temperature difference between the preforms is likely to occur for each unit. Hereinafter, effects and functions will be described based on the configuration of the manufacturing method, and the same effects and functions will be exhibited in the configuration of the manufacturing apparatus corresponding to the configuration of the manufacturing method. In the above resin container manufacturing method, the multi-stage temperature adjustment process S2 is performed, which includes at least the first temperature adjustment process S2-1, the second temperature adjustment process S2-2, and the fine adjustment process S2-3a, and further includes the heat retention temperature adjustment process S2-3b as necessary. By conveying the preform 10 through the multi-stage temperature adjustment process S2 to the blow molding process S3, the container 20 can be blow-molded by reducing a difference in temperature conditions between the preforms 10, and a high-quality container can be stably manufactured.

Further, by conveying the preform 10 and the container 20 along the conveying direction A intersecting the arrangement direction C over the temperature adjustment process S2 and the blow molding process S3, the temperature of the preform 10 can be adjusted while simplifying the conveying mechanism and shortening a time required for conveying. Further, in the above-mentioned injection molding process S1, the preform 10 is injection-molded along the arrangement direction C intersecting the conveying direction A in the temperature adjustment process S2 and the blow molding process S3. Therefore, by arranging an injection port of the injection device 102 in a central portion in a longitudinal direction of the cavity mold used in the injection molding process S1, the injection device 102 itself can be arranged in a lateral direction (direction along the conveying direction) of the cavity mold, and occupied space required for manufacturing the resin container 20 can be reduced.

In addition to the temperature adjustment process S2 including the first temperature adjustment process S2-1, the second temperature adjustment process S2-2, and the fine adjustment process S2-3a, by providing a natural cooling process between the injection molding process S1 and the temperature adjustment process S2, the temperature of the preform 10 can be adjusted in more multi-stages, the container 20 can be blow-molded by further reducing the difference in the temperature conditions between the preforms 10, and a high-quality container 20 can be more stably manufactured. By naturally cooling the preform 10 tin the atmosphere between the injection molding process S1 and the temperature adjustment process S2, a cooling time of the injection molding process S1 can be shortened, the injection molding process S1 can be repeated in a short time, and a production amount of the container 20 per unit time can be further increased.

At a stage shortly after the injection molding process S1, the temperature of the preform 10 is relatively high, which deviates from the optimum temperature for blow molding. As the blow molding process S3 approaches, it is required to adjust the temperature of the preform 10 to the optimum temperature for blow molding. By adopting a condition that has a higher ability to lower the temperature of the preform 10 in the first temperature adjustment process S2-1 than that in the second temperature adjustment process S2-2, the temperature of the preform 10 can be lowered in a short time immediately after the injection molding process S1 is completed, and in the second temperature adjustment process S2-2, the temperature of the preform 10 can be adjusted to the optimum temperature for blow molding. Therefore, the high-quality container 20 can be manufactured more stably.

According to the preferred embodiment of the first temperature adjustment part 210 and the second temperature adjustment process 220, in the first temperature adjustment process S2-1, the temperature of the preform 10 can be lowered in a short time by sandwiching the preform 10 between the temperature adjustment core mold and the temperature adjustment cavity mold, and in the second temperature adjustment process S2-2, the temperature of the preform 10 can be adjusted to the optimum temperature for blow molding by the method of blowing gas onto the preform 10. Therefore, the high-quality container 20 can be manufactured more stably.

In the embodiment in which the preform 10 is preliminarily blown in the temperature adjustment process S2, an intermediate molded body can be formed before the blow molding process S3, and the container 20 can be blow molded from the intermediate molded body in the blow molding process S3. Accordingly, particularly in a high-weight preform 10 used for blow molding of a large container 20, the temperature of the preform 10 can be satisfactorily adjusted, and the high-quality container 20 can be stably manufactured.

When the fine adjustment process S2-3a is a local temperature adjustment process, it becomes easy to blow mold the container into a desired shape. Further, blow molding of specially shaped containers such as large containers with handles can be facilitated.

By providing the conversion process S1.5 of changing the alignment direction of the preforms 10 from the arrangement direction C to a direction along the conveying direction A between the injection molding process S1 and the temperature adjustment process S2, the preform 10 can be smoothly conveyed to the temperature adjustment process S2 and the blow molding process S3. Therefore, it is possible to maintain or improve quality of the container 20 even under a short cycle time while further improving the production amount of the container 20 per unit time. Further, if the natural cooling step is performed in the conversion process S1.5, natural cooling can be performed during the direction change of the preform 10, and the container can be manufactured more efficiently.

Since the injection molding process S1 includes the injection process S1-1 and the post-cooling process S1-2, the preform 10 can be released from the cavity in a state where the cooling is not completely completed in the injection process S1-1, and the cooling of the preform 10 can be continued in the post-cooling process S1-2. When the preform 10 is being cooled in the post-cooling process S1-2, the injection process S1-1 of the next preform 10 can be performed, the injection molding process S1 can be repeated in a short time, and the production amount of the container 20 per unit time can be further increased. That is, high cycle container manufacturing can be achieved. Further, since the temperature of the preform 10 can be adjusted in multiple stages even in a high cycle by providing the temperature adjustment process S2 with the first temperature adjustment process S2-1, the second temperature adjustment process S2-2, and the fine adjustment process S2-3a, the container 20 can be blow-molded by reducing the difference in the temperature conditions between the preforms 10, and the high-quality container 20 can be stably manufactured.

In the above resin container manufacturing method, the temperature adjustment process S2 includes the heat retention temperature adjustment process S2-3b for preventing the temperature drop of the preform 10. Therefore, it is possible to prevent the preform 10 whose temperature has been adjusted to the optimum temperature for blow molding from dropping due to a waiting time before the blow molding, the temperature of the preform 10 is reliably made uniform, and the high-quality container 20 can be stably manufactured.

Even in the high-cycle method in which the injection molding process S1 is repeated in a short time to increase the production amount of the container 20 per unit time, by providing the heat retention temperature adjustment process S2-3b, the temperature of the preform 10 can be reliably made uniform, and the high-quality container can be stably manufactured.

In the above resin container manufacturing method, the multi-stage temperature adjustment process S2 is performed, which includes the first temperature adjustment process S2-1, the second temperature adjustment process S2-2, the heat retention temperature adjustment process S2-3b, and the fine adjustment process S2-3a. By conveying the preform 10 through the multi-stage temperature adjustment process S2 to the blow molding process S3, the container 20 can be blow-molded by reducing a difference in temperature conditions between the preforms 10, and the high-quality container 20 can be more stably manufactured.

By naturally cooling the preform 10 in the atmosphere between the injection molding process S1 and the temperature adjustment process S2, the cooling time of the injection molding process S1 can be shortened, the injection molding process S1 can be repeated in a short time, and the production amount of the resin container 20 per unit time can be further increased. When the temperature adjustment process S2 includes the first temperature adjustment process S2-1, the second temperature adjustment process S2-2, the heat retention temperature adjustment process S2-3b, and the fine adjustment process S2-3a, by providing the natural cooling process between the injection molding process S1 and the temperature adjustment process S2, the temperature of the preform 10 can be adjusted in more multi-stages, the container 20 can be blow-molded by further reducing the difference in the temperature conditions between the preforms, and the high-quality container 20 can be more stably manufactured.

In the present disclosure, linear conveying does not mean only the case where the preforms can be connected by exactly one straight line, and even when the preforms are conveyed by a plurality of conveying paths tilted at slightly different angles, the effect of aligning by the conversion mechanism 500 can be obtained. In the present disclosure, the effects of the present disclosure can be obtained even by aligning the plurality of preforms arranged in an inclination of, for example, 30° to 150° with respect to the conveying path extending substantially linearly of the temperature adjustment part 200 and the blow molding part 300 by the conversion mechanism 500. Further, orthogonal refers not only to an exact 90° angle, but also includes angles of, for example, approximately 90°±5°.

Temperature conditions of the first temperature adjustment part 210, the second temperature adjustment part 220, the heat retention temperature adjustment part 230, and the fine adjustment part 240 may be finely adjusted for each preform to be conveyed.

The present invention is not limited to the above embodiment and may be modified or improved as appropriate. Materials, shapes, dimensions, numerical values, forms, numbers, arrangement places, and the like of components in the above embodiment are optional and not limited as long as the present invention can be achieved.

The present application is based on Japanese Patent Application No. 2019-166591 filed on Sep. 12, 2019, and Japanese Patent Application No. 2019-166592 filed on Sep. 12, 2019, the entire contents of which are incorporated herein by reference. Further, all references cited here are entirely incorporated.

REFERENCE SIGNS LIST

1, 1001: manufacturing apparatus
10: preform
20: container
100: injection molding part
110: first injection mold
112: injection cavity mold
120: second injection mold
122: injection core mold
124: injection neck mold
140: cooling pod
200, 1200: temperature adjustment part
210: first temperature adjustment part
220: second temperature adjustment part
230: heat retention temperature adjustment part
240: fine adjustment part
300, 1300: blow molding part
310: primary blow part
320: final blow part
400: take-out part
500: conversion mechanism
510a, 510b: holding member
X1: first central axis
X2: second central axis
A: conveying direction
C: arrangement direction
P1: injection position
P2: post-cooling position
P3: receiving position
P4: sending position
S1: injection molding process
S1.5: conversion process
S2: temperature adjustment process
S3: blow molding process

The invention claimed is:

1. A resin container manufacturing method comprising:
an injection molding process of injection molding a plurality of preforms along a predetermined arrangement direction;
a temperature adjustment process of adjusting a temperature of the preform; and
a blow molding process of molding a resin container from the preform,
wherein after the injection molding process, the preform is conveyed along a conveying direction intersecting the arrangement direction over the temperature adjustment process and the blow molding process, and the resin container molded during the blow molding process is conveyed along the conveying direction in the blow molding process, and
wherein the temperature adjustment process includes a first temperature adjustment process of adjusting the temperature of the preform, a second temperature adjustment process of adjusting the temperature of the preform under a condition different from that of the first temperature adjustment process, and a fine adjustment process of finely adjusting the temperature of the preform.

2. The resin container manufacturing method according to claim 1,
wherein a condition for adjusting the temperature of the preform in the first temperature adjustment process has a higher ability to lower the temperature of the preform than a condition for adjusting the temperature of the preform in the second temperature adjustment process.

3. The resin container manufacturing method according to claim 1,
wherein in the first temperature adjustment process, the temperature of the preform is adjusted by sandwiching the preform between a temperature adjustment core mold and a temperature adjustment cavity mold, and
wherein in the second temperature adjustment process, the temperature of the preform is adjusted by blowing a gas onto the preform.

4. The resin container manufacturing method according to claim 1,
wherein the injection molding process includes an injection process of injecting molten resin into a cavity to mold the preform, and a post-cooling process of cooling the preform molded in the injection process and released from the cavity.

5. The resin container manufacturing method according to claim 1,
wherein the blow molding process includes a final blow process of blow molding N2 (N2 is an integer of 1 or more) of the containers at one time,
wherein in the blow molding process, the preforms and the containers are intermittently conveyed by N2 pieces, and
wherein in a case where one preform located at one end of the plurality of preforms along the arrangement direction in the injection molding process is defined as a first preform and one preform located at another end is defined as an N1st preform (N1 is an integer of 2 or more), N1 and N2 satisfy a relationship of N1>N2.

6. A resin container manufacturing apparatus comprising:
an injection molding part that injection molds a plurality of preforms along a predetermined arrangement direction;
a temperature adjustment part that adjusts a temperature of the preform; and a blow molding part that molds a resin container from the preform, wherein the resin container manufacturing apparatus includes a conveying mechanism that conveys the preform and the container along a conveying direction intersecting the arrangement direction over the temperature adjustment part and the blow molding part, and wherein the temperature adjustment part includes a first temperature adjustment part that adjusts the temperature of the preform, a second temperature adjustment part that adjusts the temperature of the preform under a condition different from that of the first temperature adjustment part, and a fine adjustment part that finely adjusts the temperature of the preform.

7. The resin container manufacturing apparatus according to claim 6, wherein a condition for adjusting the temperature of the preform in the first temperature adjustment part has a higher ability to lower the temperature of the preform than a condition for adjusting the temperature of the preform in the second temperature adjustment part.

8. The resin container manufacturing apparatus according to claim 6, wherein the first temperature adjustment part includes a temperature adjustment core mold and a temperature adjustment cavity mold configured to adjust the temperature of the preform by sandwiching the preform therebetween, and wherein the second temperature adjustment part includes a blow core mold that adjusts the temperature of the preform by blowing a gas onto the preform.

9. The resin container manufacturing apparatus according to claim 6, wherein the injection molding part includes an injection part that injects molten resin into a cavity to mold the preform, and a post-cooling part that cools the preform molded in the injection part and released from the cavity.

10. The resin container manufacturing apparatus according to claim 6, wherein the blow molding part includes a final blow part that blow molds N2 (N2 is an integer of 1 or more) of the containers at one time, wherein in the blow molding part, the preforms and the containers are intermittently conveyed by N2 pieces, and wherein in a case where one preform located at one end of the plurality of preforms along the arrangement direction in the injection molding part is defined as a first preform and one preform located at another end is defined as an N1st preform (N1 is an integer of 2 or more), N1 and N2 satisfy a relationship of N1>N2.

11. A resin container manufacturing apparatus comprising:

an injection molding part that injection molds a plurality of preforms along a predetermined arrangement direction;

a temperature adjustment part that adjusts a temperature of the preform; and a blow molding part that molds a resin container from the preform, wherein the resin container manufacturing apparatus includes a conveying mechanism that conveys the preform and the container along a conveying direction intersecting the arrangement direction over the temperature adjustment part and the blow molding part, and wherein the temperature adjustment part includes a heat retention temperature adjustment part that prevents a temperature drop of the preform whose temperature has been adjusted.

12. The resin container manufacturing apparatus according to claim 11, wherein the injection molding part includes an injection part that injects molten resin into a cavity to mold the preform, and a post-cooling part that cools the preform molded in the injection part and released from the cavity.

13. The resin container manufacturing apparatus according to claim 11, wherein the temperature adjustment part includes a first temperature adjustment part that adjusts the temperature of the preform, a second temperature adjustment part that adjusts the temperature of the preform under a condition different from that of the first temperature adjustment part, and a fine adjustment part that finely adjusts the temperature of the preform.

14. The resin container manufacturing apparatus according to claim 11, wherein the blow molding part includes a final blow part that blow molds N2 (N2 is an integer of 1 or more) of the containers at one time, wherein in the blow molding part, the preforms and the containers are intermittently conveyed by N2 pieces, and wherein in a case where one preform located at one end of the plurality of preforms along the arrangement direction in the injection molding part is defined as a first preform and one preform located at another end is defined as an N1st preform (N1 is an integer of 2 or more), N1 and N2 satisfy a relationship of N1>N2.

\* \* \* \* \*